(12) United States Patent
Fanelli

(10) Patent No.: US 6,319,999 B1
(45) Date of Patent: Nov. 20, 2001

(54) METHOD FOR THE PRODUCTION OF POLYADDUCTS OF ALKYLENE OXIDES WITH A LIQUID IN GAS DISPERSION REACTOR

(75) Inventor: Pasquale Fanelli, Monza (IT)

(73) Assignee: Linde Aktiengesellschaft, Hollriegelskreuth (DE)

(*) Notice: Subject to any disclaimer, the term of this patent is extended or adjusted under 35 U.S.C. 154(b) by 0 days.

(21) Appl. No.: 09/331,855

(22) PCT Filed: Dec. 23, 1997

(86) PCT No.: PCT/EP97/07272

§ 371 Date: Sep. 27, 1999

§ 102(e) Date: Sep. 27, 1999

(87) PCT Pub. No.: WO98/29458

PCT Pub. Date: Jul. 9, 1998

(30) Foreign Application Priority Data

Dec. 27, 1996 (EP) .................................................. 96830658

(51) Int. Cl.⁷ ............................. C08G 65/28; B01J 19/26
(52) U.S. Cl. ............................. 526/67; 526/68; 528/417; 528/421; 568/608; 568/618; 568/620; 422/131; 422/132; 422/134; 422/138
(58) Field of Search ........................ 526/67, 68; 528/417, 528/421; 568/608, 618, 620; 422/131, 132, 134, 138

(56) References Cited

U.S. PATENT DOCUMENTS 3,182,050 * 5/1965 Irvin .
3,894,093 7/1975 Raizner et al. .

FOREIGN PATENT DOCUMENTS

| 1936046 | 2/1971 | (DE) . |
| 4300449 | 7/1994 | (DE) . |
| 736991 | 9/1951 | (GB) . |
| 1226406 | 1/1991 | (IT) . |
| 9511213 | 4/1995 | (WO) . |

OTHER PUBLICATIONS

Database WPI, Section Ch, Week 8326, Derwent Publications Ltd., London, GB; Class A25, AN 83–61396K XP002032022 & DD 159 262 A (Ven Synthesew Schwa), Mar. 2, 1983.

* cited by examiner

Primary Examiner—David J. Buttner
(74) Attorney, Agent, or Firm—Millen, White, Zelano & Branigan, P.C.

(57) ABSTRACT

For the semi-continuous production polyadducts of alkylene oxide by an addition reaction of alkylene oxide on a chain initiator having at least one active hydrogen, there is provided a reactor (1) constituted by a cylindrical body with two diameters, the upper part being of larger diameter than the lower part, heat-exchange means (2) and recycling ducts (13, 15) for the recycling of the reaction mixture from the bottom to the head of the reactor in order to obtain the final desired product, thereby enabling the production to be carried out with greater flexibility and reduced down times.

21 Claims, 1 Drawing Sheet

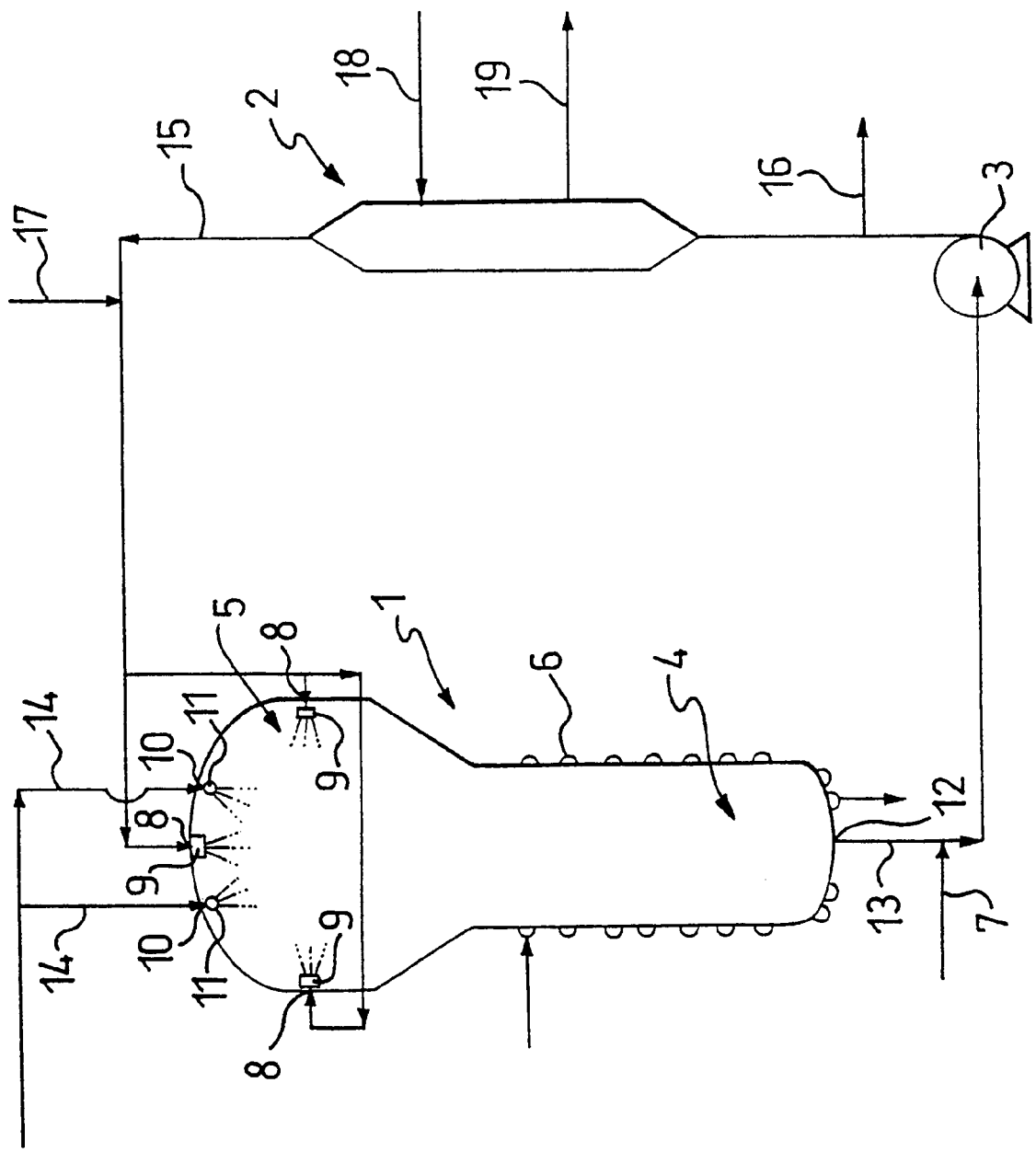

METHOD FOR THE PRODUCTION OF POLYADDUCTS OF ALKYLENE OXIDES WITH A LIQUID IN GAS DISPERSION REACTOR

The present invention relates to a new semi-continuous process and apparatus for the production of polyadducts of alkylene oxides by an addition reaction of alkylene oxide on a chain initiator which has at least one active hydrogen. These products, particularly the polyadducts of ethylene oxide and propylene oxide, are used mainly as non-ionic surfactants and polyether-polyols.

Non-ionic surfactants are very widely used as wetting agents, dispersants, stabilisers, emulsifying agents and anti-emulsifying, anti-foaming and foaming agents and, in general, as auxiliary chemicals and functional fluids in the textile, paper, cellulose, pharmaceutical, food, cosmetic, paint, resin, mineral extraction and processing, advanced recovery and extraction of petroleum industries. In particular the use should be mentioned of non-ionic surfactants based on natural or synthetic fatty alcohols, as primary components in the formulation of household and industrial detergents and also of polyether-polyols as the main intermediates in the production of polyurethanes (rigid, semi-rigid, flexible foams, elastomers, adhesives, sealants, etc).

Italian Patent No. 1 226 405 describes a method for the production of polymerisation products of alkylene oxides starting from alkylene oxides, ethylene and/or propylene oxides being most commonly used, and compounds having an active or mobile hydrogen atom with suitable catalysts. The method of this patent uses a two-section reactor of which the upper is termed the gas-liquid reactor and the lower is an accumulation reservoir, disposed essentially horizontally. The gas-liquid reaction takes place in the upper section, the chain initiator being supplied from a plurality of spray heads on a central distributor while the lower body acts as a receiver and for recycling through a pump and an external heat exchanger, the reaction product coming from the upper section being resupplied to the latter to continue the polymerisation reaction.

Italian Patent No. 1 226 406 describes a method for obtaining polymerisation products of alkylene oxides which uses a two-section reactor of which the upper is termed the gas-liquid reactor and the lower is an accumulation reservoir, each section having a plurality of spray heads. The first phase of the reaction occurs in the lower section which is arranged vertically and continues until a given quantity of polymerisation product is formed; subsequently the polymerisation reaction is transferred to the upper section, arranged horizontally, where the reaction can continue until the desired product is obtained.

The processes described in the aforesaid patents, however, have several disadvantages. First of all they use two-section reactors which complicates the overall structure of the plant and increases costs; the two-section reactors also have a large-diameter communication aperture and, for Italian Patent 1 226 406, a larger number of apertures, thus increasing the possibility of loss of alkylene oxide and formation of dead zones and internal surfaces exposed to the oxide. As two-section internal distributors are provided, the surface-volume ratio of these reactors is higher, increasing the probability of secondary reactions. The double-bodied configuration and presence of internal distributors also creates dead spaces within the reactor which makes it difficult to drain and clean the reactor, thus increasing problems in changing production.

It should also be mentioned that the flow under gravity of the reaction product which collects in the upper horizontal section and is then ducted down into the lower one induces retrodiffusion and hence overexposure to the oxide atmosphere.

The problem at the root of the invention is thus to provide a process for the production of polyadducts of alkylene oxides which is able to overcome the problems of the prior art.

The problem is resolved., according to the invention, by a semi-continuous process for the production of polyadducts of alkylene oxides, by the addition reaction of alkylene oxide on a chain initiator which has at least one active hydrogen, characterised in that it includes the steps of:

providing a reactor constituted by a cylindrical body with two diameters, arranged with its longitudinal axis substantially vertical, with the upper part of the cylindrical body of a greater diameter than the lower part, and the reactor having inlet and outlet apertures, equipment for atomising the reaction mixture and equipment for atomising the alkylene oxide, the atomising equipment being located and arranged over the entire inner surface of the upper part of the reactor;

loading the reactor with a predetermined volume of liquid including the chain initiator;

discharging the liquid through the outlet aperture and bringing it to a predetermined reaction temperature by means of heat-exchange means;

atomising the liquid by means of the atomising equipment and introducing the alkylene oxide through the atomising equipment to obtain an intermediate liquid reaction product which forms a mixture with the liquid chain initiator;

recycling the mixture obtained continuously after it has been brought back to the predetermined reaction temperature, by atomising it in the upper part of the reactor by means of the atomising equipment and making it react with a further quantity of alkylene oxide in order to obtain a final product with the desired chain length.

The chain initiator is usually used in quantities equal to the ratio between the final quantity of the product and the growth ratio where the growth ratio is defined as the ratio between the molecular weight of the product and the molecular weight of the chain initiator.

The chain initiators which may be used are compounds having at least one active hydrogen according to the final product it is desired to obtain; examples of such chain initiators may be found among the alkylphenols, such as octylphenol, nonylphenol, dodecylphenol, dinonylphenol, tristyrylphenol; natural and synthetic fatty alcohols and mixtures thereof, such as decyl alcohol, tridecyl alcohol, oleyl alcohol, oleylacetyl alcohol, cetylstearyl alcohol, lanolin, cholesterol, acetylene diol; fatty amines and hydrogenated amines, such as laurylamine, oleylamine, amine derived from coconut oil, tallow amine and soya amine, soya iminopropylenamine, abietylamine; fatty amides, such as laurylamide, stearyl amide, fatty amides derived from coconut oil, soya and tallow; fatty acids such as coconut, lauric, tallow, stearic, palmitic, oleic, myristic, linoleic, abietic and naphthenic acids; sorbitan esters such as the monolaurate, monopalmitate, monostearate, mono-oleate, monoabietate, dilaurate, tristearate, trioleate, pentalaurate, hexaoleate, hexastearate; monoglycerides and monostearates of, for example, coconut and glycerol; pentaerythritol esters, such as the monolaurate, mono-oleate and of lanolin; ethylene glycols, such as mono-, di-, tri-ethylene glycols and poly-ethylene glycols; propylene glycols, such as mono-, di-, tri-propylene glycols and polypropylene glycols; ethylene oxide/propylene oxide block polymers and random sequences thereof based on various chain initiators, such as fatty amines, fatty alcohols, glycerol, dipropylene glycol etc; oils such as castor-oil, hydrogenated castor-oil, mink oil, tallow and tall oil; mercaptans such as dodecyl mercaptan.

In order to activate the alkoxylation reaction, to speed it up and, whenever necessary, a catalyst is introduced into the reactor which must disperse completely in the chain initiator to give rise to the reaction of the alcoholate in situ.

A particularly preferred embodiment of the invention provides for the use of a basic catalyst which is selected from the group comprising hydroxides and alcoholates of alkali metals and hydroxides of alkaline-earth metals. Acidic catalysts may however also be used even though they are not preferred since they have the disadvantage of increasing the concentration of dioxan in the product. The catalyst may be added either in the solid phase or in aqueous solution and is introduced directly into the external recycling duct, there mixing with the chain initiator already upstream of the reactor.

When desired, however, it is possible to introduce the catalyst directly into the body of the reactor and to mix it with the chain initiator therein.

Before the reaction is initiated it is necessary to atomise the catalysed reaction initiator so as to form finely dispersed droplets in the atmosphere in the reactor. In order to form this liquid phase, the mixture is recycled through an external circuit from the lower to the upper part of the reactor where a plurality of atomisers is installed, these being distributed over the internal surface of the upper part. The chain initiator is dispersed over a complete cone which may vary from 15° to 150° and is effected with atomising devices which generate droplets having a Sauter diameter of less than 500 $\mu$m.

To advantage, each atomiser comprises a substantially frusto-conical hollow body which projects inwardly from the reactor wall at the larger-diameter end at which the atomiser is in fluid-communication with the external recycling circuit. A plurality of nozzles is provided in the atomiser body, homogenously distributed over the surface thereof, through which the atomised liquid phase is introduced into the reactor. It is appropriate to stress that the frusto-conical form of the atomiser enables the nozzles to be oriented within the reactor so as to supply the atomised liquid over a cone with a very large angle.

It is particularly advantageous to bring the chain initiator to the temperature at which the polyaddition reaction occurs before the alkylene oxide is added in order to minimise the time in which the reaction itself is induced.

To this end, one preferred embodiment of the present invention provides a heat exchanger in the external circuit to heat the catalysed chain initiator during its recycling.

A particular embodiment of the present invention also provides for the lower part of the reactor and the external recycling circuit to be kept at a predetermined temperature such as to prevent the solidification of chain initiators with high melting points during the loading and subsequent heating of the chain initiator.

A preferred embodiment of the present invention provides a step in which the catalysed chain initiator is dried before the reaction is initiated. The drying is carried out within the reactor by means of a combination of evacuation and heat. With the use of the process of the present invention, by virtue of the very high degree of dispersion of the catalysed chain initiator in the gaseous phase in the reactor and the large number of recycling loops per unit time, it is possible to reduce the moisture present in the reactor to less than 50 ppm. This drastically reduces the quantity of polyethylene glycols or polypropylene glycols which form at the same time as the desired product.

The alkoxylation reaction is normally carried out at temperatures which may vary between 70° C. and 195° C., preferably between 90° C. and 180° C. according to the type of production, and at a relative pressure determined partly by the presence of inert gas, generally nitrogen, and partly by the alkylene oxide itself. Generally the relative pressure of the reaction does not in any case exceed 6 $10^2$ kPa.

The liquid alkylene oxide is then introduced into the reactor where it comes into contact with an atmosphere of inert gas and finely dispersed droplets of catalysed chain initiator. Immediately the oxide comes into contact with the chain initiator, it vaporises and starts to dissolve in the droplets. As mentioned above, the high dispersion of the liquid phase in the gas enables the exchange of mass and energy between the two phases to occur very quickly with a contact time of the reagents equal to the flight time of the droplets.

The process according to the invention is particularly effective when alkylene oxides selected from the group comprising ethylene oxide, propylene oxide, butylene oxide and mixtures thereof are used.

As the reaction proceeds and the molecular weight increases, the lower part of the reactor becomes filled with the reaction product while the heat of reaction is removed by the heat-exchange means. In a particularly advantageous embodiment, the heat exchanger is located in the external recycling circuit and is the same as that used in the pre-reaction step for heating the liquid containing the catalysed chain initiator. This embodiment, with the heat exchanger being located in the external recycling circuit, enables extremely good transfer of the heat evolved by the exothermic reaction to be achieved.

During the reaction, the alkylene oxide is added with automatic control of the mass, pressure and reaction temperature transmitted directly from the reactor and from the reaction circuit and of the temperature of the pressurised cooling water.

The alkylene oxide is absorbed quantitatively in the upper part of the reactor where the droplets of catalysed initiator are finely dispersed in the gaseous atmosphere constituted by inert gas and alkylene oxide.

As the alkoxylation reaction takes place in the liquid phase, there is a progressive reduction in the concentration of alkylene oxide in the liquid mass in the reactor, the oxide moving from the free surface of the reactor to the bottom thereof.

Corresponding to the reduction in the alkylene oxide concentration, the temperature increases from the free surface to the bottom of the reactor, the alkoxylation reaction being exothermic.

The reaction mechanism, being free from retrodiffusion, combines gradually decreasing dissolved alkylene oxide concentrations with gradually increasing temperatures in the reaction mass.

Hence, for given reaction kinetics, the concentration of alkylene oxide in the reaction product which leaves the bottom of the reactor to be recycled is less than that obtainable by other processes, particularly in conventional agitated reactors and reactors with internal Venturi systems, with a bubble-diffusion mechanism for the alkylene oxide.

A further result is that the quality of the product, which is linked to the secondary reactions of the alkylene oxide, is improved.

After the reaction phase, the alkylene residue is exhausted and the product obtained has a free alkylene oxide content of less than 1 ppm.

In some cases, and only if strictly necessary, the final product is stripped before being cooled and neutralised. In any case, all of the post-reaction steps may be carried out in the same reactor as that used for the process which is the subject of the present invention.

A particular form of the present invention provides for the addition of at least one conventional reactor and/or reactor of the type used in the process of the present invention in series or in parallel.

The series arrangement enables the production of polyadducts with high growths in very short production times while the parallel arrangement allows a considerable increase in the flexibility of the production of the plant. This embodiment also enables the process to be started with solid chain initiators (to be melted), solids in suspension, in aqueous solution or in solvents or the production of polyadducts with high viscosities (over 700 cP).

The process of the present invention also enables the use of chain initiators which are liquid, solid (before melting), in suspension, in aqueous solution, in solvents, etc; it is thus possible to operate with chain initiators with a wide range of viscosities, densities, vapour pressures, molecular weights, acidities, unsaturation, etc.

The process for the production of polyadducts of alkylene oxides according to the present invention enables high productivities to be achieved since, by virtue of the very high dispersion, the gas-liquid material transfer is considerably improved, giving better absorption of alkylene oxide for a given quantity of chain initiator, type and concentration of catalyst, partial pressure of alkylene oxide and reaction temperature and also shorter drying times for a given residual moisture content.

The process of the present invention also gives greater flexibility of production and shorter down-times; with the configuration described above, it is in fact possible to start the process with a volume of chain initiator of up to $\frac{1}{90}$ of the volume of the final reaction product, enabling very high molecular weights to be achieved in a single production batch or, if necessary, the production of smaller quantities of polyadduct for the same growth.

The high transfer of material enables more favourable reaction conditions to be achieved and also more thorough de-airation and dehydration of the chain initiator which results in less formation of undesirable byproducts and contaminants. The product obtained is thus of a better and more consistent quality.

The shape of the reactor and absence of distributors therein offer a smaller surface-volume ratio and a very long gas-liquid contact time in the upper part of the reactor. This minimises the ratio of the surface area (S) of metal exposed to gaseous alkylene oxide to the free volume (V) of the vaporised oxide itself, this ratio not exceeding for example, 1.55 m$^{-1}$ for reactors having a capacity of 10 ton/batch and 1.30$^{-1}$ for reactors having a capacity of 50 ton/batch, and creates a very high concentration gradient of the alkylene oxide from the top towards the bottom of the reactor, with a very high temperature gradient from the bottom to the top. The almost total lack of residual oxide in the reactor, particularly in the zone in which the temperature is highest, provides greater safety, particularly as regards the danger of explosions, than conventional reactors which have a bubble-dispersion model for the oxide.

The lack of dead spaces also means that the residual product in the reactor and in the associated circuit when the final product has been discharged is less than 0.05 kg/m$^2$ of internal surface of the reactor. With the process of the present invention it is thus possible to carry out numerous production cycles, or indeed to change the type of production, without the quality of the final product of a batch being affected by the presence of a considerable quantity of residual material from the previous batch.

The distribution of the atomisers over the inner surface of the upper part of the reactor enables 100% of the internal volume of the reactor to be covered whatever the level of reaction liquid, thus maximising the transfer of material for any degree of growth and minimising the coalescence of the droplets on the wall before they reach the free surface of the liquid phase. As the inner surface of the upper part of the reactor is completely wetted by the reaction liquid, the formation of any hot spots due to localised heat flows from the exterior of the reactor is prevented, thus considerably reducing the probability of explosions in the reactor itself.

The process according to the invention enables growths of up to ninety times the weight of the chain initiator and more to be achieved in a single reaction stage without the need for post-reactive steps and/or intermediate venting and/or, as in conventional alkoxylation processes, discharges into an intermediate product reservoir.

A further advantage of the present invention, particularly for ethoxylation, lies in the total absence of mechanical seals in contact with alkylene oxide vapours, which considerably reduces the probability that the minimum energy threshold for triggering ethylene oxide vapour will be exceeded.

The process according to the present invention also reduces the concentration of dioxan in the final product surprisingly compared with the prior art, which result is thus more ecological and less dangerous to health.

In addition, the type of reactor used in the process of the present invention may be washed (if necessary) more easily and quickly by virtue of its smaller surface-volume ratio, absence of dead spaces (absence of internal distributors and other internal parts) and the smaller quantity of residual material at the end of the reaction.

The distribution of the atomisers over the internal surface of the upper part of the reactor also enables the entire inner surface of the reactor to be washed more efficiently, with smaller quantities of water or solvent.

The washing liquid discharged consequently also contains less noxious substance and is thus less difficult to regenerate.

The process of the invention, by virtue of the structural characteristics of the type of reactor used and all the concomitant aspects mentioned above, for example the smaller quantity of toxic emissions at the end of the reaction and the smaller energy consumption due to the greater efficiency of the various reaction cycles, thus has less environmental impact than prior art processes.

In a further aspect, the present invention provides a reactor for the production of polyadducts of alkylene oxides by an addition reaction of alkylene oxide on a chain initiator which has at least one active hydrogen, characterised in that it comprises a cylindrical body with two diameters arranged with its longitudinal axis disposed substantially vertically, with the upper part of the cylindrical body being of larger diameter than the lower part, and the reactor being provided with inlet and outlet apertures, equipment for atomising the reaction mixture and the alkylene oxide, the atomising equipment being located and distributed over the inner surface of the upper part of the cylindrical body.

The characteristics and advantages of the invention will become more apparent from the description which follows of embodiments of the process described above, made with reference to apparatus shown schematically in the single appended drawing, given purely by way of example.

BRIEF DESCRIPTION OF THE DRAWING

With reference to the said drawing, apparatus used for the process of the invention comprises a reactor 1 constituted by a cylindrical body with two diameters arranged with its longitudinal axis vertical, a heat exchanger 2 and a centrifugal pump 3 for recycling the reaction product through a discharge duct 13, the heat exchanger 2 and a recycling duct 15 from a lower part 4 of the reactor 1 to an upper part 5 of larger diameter than the lower part 4. The lower part 4 has a device with half-tubes and/or special plates 6 supplied continuously with steam or pressurised hot water.

An inlet duct 7 is provided in the reaction circuit for supplying a chain initiator to the reactor 1. The latter includes four inlets 8, of which only three are visible in the drawing, each associated with an atomiser 9 for atomising the recycled product fed into the upper part 5 of the reactor 1, four apertures 10, of which only two are visible in the drawing, each associated with an atomiser 11 for atomising the alkxylene oxide fed into the upper part 5 of the reactor 1, and an outlet aperture 12 for the recycling of an intermediate reaction product through the ducts 13, 15.

The atomisers 9 and 11 each comprise a frusto-conical hollow body on which are formed a plurality of small nozzles, in the example eight nozzles, projecting from the body itself and disposed uniformly thereon.

The atomisers 9 are distributed over the surface of the upper part 5 of the reactor 1. One of them is at the apex of the reactor 1 while the other three are contained in a plane perpendicular to the longitudinal vertical axis and are spaced circumferentially at 120° from each other. The four atomisers 11 are instead located symmetrically around the atomiser 9 at the apex of the reactor.

Downstream of the recycling pump 3 and upstream of the heat exchanger 2 is a duct 16 for the discharge of the final product while downstream of the heat exchanger 2 is an inlet duct 17 for the catalyst. The heat exchanger is supplied with hot or cold pressurised water through inlet and outlet ducts 18 and 19; any other conventional fluid such as a diathermic oil may however be used instead of the pressurised water.

The reactor 1 is supplied with liquid chain initiator through the duct 7 until a predetermined weight is reached. At this point the liquid supplied is recycled by means of the pump 3 through the exhaust aperture 12 and the heat exchanger 2 and is reintroduced into the reactor 1 through the duct 15 and the atomisers 9 in the form of finely dispersed droplets. At the same time, the catalyst to be used for the polymerisation reaction is introduced into the recycling duct 15 through the duct 17, the catalyst dispersing completely in the liquid phase of the chain initiator: a fine dispersion of droplets containing the chain initiator, the catalyst and water is thus obtained at the top of the reactor. The catalysed chain initiator is dried by means of heat and vacuum.

Once the optimum conditions for triggering the reaction have been reached (temperature, catalyst concentration, degree of humidity, pressure etc) the supply of alkylene oxide is started through the duct 14, the apertures 10 and the atomisers 11. This starts the absorption of the oxide by the droplets of catalysed chain initiator in the upper part of the reactor 1 and hence the chemical reaction in the lower part of the reactor 1.

In fact the droplets saturated with alkylene oxide coalesce on the free surface of the liquid phase in the reactor 1 where the alkoxylation reaction takes place. The liquid phase, after a suitable stay time, is recycled through the duct 15 and emitted continuously into the top of the reactor 1 through the atomisers 9.

During the recycling, the liquid phase continuously gives up its heat, a great deal of which is evolved by the strongly exothermic alkoxylation reaction, in the heat exchanger 2 to which, in the meantime, pressurised cooling water is supplied. The reaction then continues with the alkylene oxide being supplied continuously until the desired molecular growth is achieved. The product is cooled, and if necessary, stripped and neutralised and finally discharged from the reactor and the associated circuit through the duct 16 before a further production cycle is started.

EXAMPLE 1

Production of 10000 kg of C12–C14 Fatty Alcohol+2.8 Moles of Ethylene Oxide

The reactor of the plant described above, having a S/V ratio of 1.55 m$^{-1}$, was loaded with 6125 kg of $C_{12}$–$C_{14}$ fatty alcohol (MW 195) and 2.5 kg of NaOH, as the catalyst. This was dried at 135° C. with a vacuum down to 5 mbar and, after the vacuum had been replaced by nitrogen and the mixture had been heated to the reaction temperature (160° C.), 3875 kg of ethylene oxide were made to react at a maximum relative reaction pressure of 4.75 10$^2$ kPa.

At the end of the reaction, the product was cooled, neutralised and discharged. No stripping nor post-treatments were carried out.

The overall production time was 170 minutes from the loading of the first material to the discharge of the finished product.

The quality of the product was as follows:

| | |
|---|---|
| Appearance at 25° C. | Limpid |
| Colour, APHA | 5 max |
| Water (ppm) | 100 max |
| pH (3% aqueous solution, 25° C.) | 6–7 |
| Hydroxyl No (mg KOH/g) | 176 +/− 1.5 |
| Polyethylene glycol (% weight) | 0.25 max |
| Ash (AA) (ppm) | 200 max |
| Dioxan (ppm) | 1 max |
| Free ethylene oxide (ppm) | 0.5 max |

EXAMPLE 2

Production of 10000 kg of Monyldhenol +9.0 Moles of Ethylene Oxide

The reactor of the plant described above, having a S/V ratio of 1.55 m$^{-1}$, was loaded with 3569 kg of nonylphenol (MW 220) and 2.5 kg of NaOH, as the catalyst. Drying was carried out at 140° C. with a vacuum of less than 5 mbar and, after the vacuum had been replaced by nitrogen and the mixture heated to the reaction temperature (165° C.), 6431 kg of ethylene oxide were made to react at a maximum relative reaction pressure of 4.75 10$^2$ kPa:

When the reaction had finished, the mixture was cooled, neutralised and discharged. No stripping nor post-treatments were carried out.

The overall production time was 185 minutes from the loading of the first material to the discharge of the finished product. The quality of the product was as follows;

| | |
|---|---|
| Appearance at 25° C. | Limpid liquid |
| Colour, APHA | 10 max |
| Water (ppm) | 100 max |
| pH (3% aqueous solution, 25° C.) | 6.5 +/− 0.5 |
| Hydroxyl No (mg KOH/g) | 91 +/− 1 |
| Polyethylene glycol (% weight) | 0.25 max |
| Ash (AA) (ppm) | 260 max |
| Dioxan (ppm) | 2 max |
| Free ethylene oxide (ppm) | 0.5 max |

What is claimed is:

1. A semi-continuous process for the production of polyadducts of alkylene oxides, by the addition reaction of alkylene oxide on a chain initiator which has at least one active hydrogen, characterised in that it includes the steps of:

providing a reactor (1) constituted by a cylindrical body with two diameters, arranged with its longitudinal axis substantially vertical, with the upper part of the cylindrical body of a greater diameter than the lower part, and the reactor (1) having inlet (8, 10) and outlet (12) apertures, equipment (9) for atomising the reaction mixture and equipment (11) for atomising the alkylene, oxide, the atomising equipment (9, 11) being located and arranged over the entire inner surface of the upper part of the reactor (1);

loading the reactor (1) with a predetermined volume of liquid including the chain initiator;

discharging the liquid through the outlet aperture (12) and bringing it to a predetermined reaction temperature by means of heat-exchange means (2);

atomising the liquid by means of the atomising equipment (9) and introducing the alkylene oxide through the atomising equipment (11) to obtain an intermediate liquid reaction product which forms a mixture with the liquid chain initiator;

recycling the mixture obtained continuously after it has been brought back to the predetermined reaction temperature, by atomising it in the upper part of the reactor by means of the atomising equipment (9) and making it react with a further quantity of alkylene oxide in order to obtain a final product with the desired chain length.

2. A process according to claim 1, in which the step of bringing the liquid including the chain initiator to the predetermined reaction temperature is followed immediately by a step in which the liquid is mixed with a catalyst.

3. A process according to claim 2, in which the chain initiator and the catalyst are subjected to a drying step before the step in which the alkylene oxide is introduced into the reactor (1).

4. A process according to claim 2, in which the means (2) are constituted by a heat exchanger.

5. A process according to claim 4, in which the catalyst is introduced downstream of the heat exchanger (2).

6. A process according to claim 4, in which the intermediate liquid product recycled is brought back to the predetermined temperature by cooling by means of the heat exchanger (2).

7. A process according to claim 1, in which the atomising equipment (9, 11) comprises a hollow, substantially frusto-conical body projecting inwardly from the wall of the reactor from a larger diameter end at which the atomising equipment (9, 11) is in fluid communication with respective ducts (15, 14) for the recycled flow and for the alkylene oxide, a plurality of nozzles being formed in the hollow body which nozzles are uniformly distributed over the surface thereof.

8. A process according to claim 1, in which the alkylene oxides are selected from the group consisting of ethylene oxide, propylene oxide, butylene oxide and mixtures thereof.

9. A process according to claim 1, in which the chain initiator is selected from the group consisting of alkylphenols, natural and synthetic fatty alcohols and their mixtures, fatty amines and hydrogenated amines, fatty amides, fatty acids, sorbitan esters, monoglycerides and monostearates, pentaerythritol esters, ethylene glycols, propylene glycols, block polymers made from ethylene oxide/propylene oxide, and polymers obtained from random sequences of the latter based on fatty amines, fatty alcohols, glycerine, dipropylene glycol etc, castor-oil, hydrogenated castor-oil, tallow, mink oil, tall oil and mercaptans.

10. A process according to claim 1, in which the catalyst is selected from the group consisting of hydroxides and alcoholates of alkali metals and hydroxides of alkaline-earth metals.

11. A process according to claim 1, in which the reaction temperature is between 70° C. and 195° C.

12. A process according to claim 1, said addition reaction being conducted under a relative pressure of no more than 6. $10^2$ kPa in the reactor.

13. A process according to claim 1, in which the reaction is also conducted in at least one reactor in series or in parallel with the reactor (1).

14. A reactor suitable for the production of polyadducts of alkylene oxides, by the addition reaction of alkylene oxide on a chain initiator which has at least one active hydrogen, said reactor comprising a cylindrical body with two diameters arranged with its longitudinal axis substantially vertical, with the upper part of the cylindrical body of greater diameter than the lower part, and the reactor having inlet (8, 10) and outlet (12) apertures, an atomizer (9) for atomising the reaction mixture and an atomizer (11) for atomising the alkylene oxide, the atomizers (9, 11) being located and arranged over the entire inner surface of the upper part of the cylindrical body.

15. A reactor according to claim 14, in which the atomizers (9, 11) comprise a hollow, substantially frusto-conical body projecting inwardly from the wall of the reactor from a greater-diameter end, at which the atomizers (9, 11) said apparatus further comprising ducts (15, 14) for recycle flow and for the supply of alkylene oxide, a plurality of nozzles being formed in the hollow body and uniformly distributed over the surface thereof, and said atomizers (9, 11) are in fluid communication with said ducts (15, 14) respectively.

16. A process according to claim 1, in which the chain initiator is dispersed over a complete cone varying from 15° to 150° with droplets having a Sauter diameter of less than 500 $\mu$m.

17. A reactor according to claim 14, having a capacity of 50 ton/batch, said apparatus further comprising a surface area (S) of metal exposed to gaseous alkylene oxide and free volume (V) in which the ratio of the surface area (S) of metal exposed to gaseous alkylene oxide to the free volume (V) is equal or less than 1.30 $m^{-1}$.

18. A reactor according to claim 14, having a capacity of 10 ton/batch, said apparatus further comprising a surface area (S) of metal exposed to gaseous alkylene oxide and free volume (V) in which the ratio of the surface area (S) of metal exposed to gaseous alkylene oxide to the free volume (V) is equal or less than 1.55 $m^{-1}$.

19. A process according to claim 5, in which the intermediate liquid product recycled is brought back to the predetermined temperature by cooling by means of the heat exchanger (2).

20. A process according to claim 9, in which the catalyst is selected from the group consisting of hydroxides and alcoholates of alkali metals and hydroxides of alkaline-earth metals.

21. A process according to claim 20, in which the alkylene oxides are selected from the group consisting of ethylene oxide, propylene oxide, butylene oxide and mixtures thereof.

* * * * *